(12) United States Patent
Yokoyama et al.

(10) Patent No.: US 6,820,020 B2
(45) Date of Patent: Nov. 16, 2004

(54) METHOD OF DETERMINING MAGNITUDE OF SENSING CURRENT FOR ELECTROMAGNETIC TRANSDUCER

(75) Inventors: Yukimasa Yokoyama, Kawasaki (JP); Toru Simozato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 331 days.

(21) Appl. No.: 09/751,571

(22) Filed: Dec. 29, 2000

(65) Prior Publication Data

US 2002/0016689 A1 Feb. 7, 2002

(30) Foreign Application Priority Data

Jun. 29, 2000 (JP) .................................. 2000-195502

(51) Int. Cl.$^7$ ............................................. G11B 5/03
(52) U.S. Cl. ...................... 702/65; 702/38; 702/115; 702/116; 702/129; 702/186
(58) Field of Search ............................. 702/38, 65, 66, 702/115, 116, 119, 121, 123, 129, 147, 186, 189, 194, FOR 103–104, FOR 105–106, FOR 110, FOR 124, FOR 157, FOR 142, FOR 139, FOR 150, FOR 155–157, FOR 169; 360/113, 119, 121, 123, 124, 75, 77.02, 77.08, 316, 63, 78.14, 66, 25, 46, 53

(56) References Cited

U.S. PATENT DOCUMENTS

| | | | | |
|---|---|---|---|---|
| 5,398,144 A | * | 3/1995 | Brannon ....................... 360/67 |
| 5,476,680 A | * | 12/1995 | Coffey et al. ................ 427/130 |
| 5,790,334 A | * | 8/1998 | Cunningham ................. 360/66 |
| 5,978,163 A | * | 11/1999 | Cunningham ................. 360/66 |
| 6,195,219 B1 | * | 2/2001 | Smith ........................... 360/66 |
| 6,246,552 B1 | * | 6/2001 | Soeno et al. .............. 360/294.4 |
| 6,356,404 B1 | * | 3/2002 | Nguyen ........................ 360/66 |
| 6,456,449 B1 | * | 9/2002 | Belser et al. ............. 360/77.01 |
| 6,476,602 B1 | * | 11/2002 | Gray ........................... 324/210 |
| 2002/0114092 A1 | * | 8/2002 | Yang ........................... 360/31 |

FOREIGN PATENT DOCUMENTS

JP          10105909          4/1998

* cited by examiner

Primary Examiner—Marc S. Hoff
Assistant Examiner—Carol S Tsai
(74) Attorney, Agent, or Firm—Greer, Burns & Crain, Ltd.

(57) ABSTRACT

A first resistance value of an electromagnetic transducer is calculated based on an examination current of a first current value. A second resistance value of the electromagnetic transducer is calculated based on the examination current of a second current value different from the first current value. A quantity of variation in temperature is derived based on the first and second resistance values. An expected lifetime of the electromagnetic transducer is calculated based on the derived quantity of variation in temperature. A current value for a sensing current to be supplied to the electromagnetic transducer is determined based on the calculated expected lifetime. It is possible to reliably set the maximum current value for the sensing current without suffering from deterioration or a shortened lifetime of the electromagnetic transducer resulting from a fracturing or destructive phenomenon such as a migration.

19 Claims, 5 Drawing Sheets

METHOD OF DETERMINING MAGNITUDE OF SENSING CURRENT FOR ELECTROMAGNETIC TRANSDUCER

BACKGROUND OF THE INVENTION

1. Field of the Invention

The present invention relates to an electromagnetic transducer incorporated in a magnetic recording medium drive such as a hard disk drive (HDD), a magnetic tape drive, and the like, for example. More particularly, the invention relates to a method of determining the magnitude or current value of a so-called sensing current to be supplied to an electromagnetic transducer.

2. Description of the Prior Art

When an electromagnetic transducer such as a giant magnetoresistive (GMR) element is utilized to read out magnetic information data, for example, a sensing current is supplied to the electromagnetic transducer. The inversion of the direction of an acting magnetic flux or field induces variation in the voltage appearing in the electromagnetic transducer in response to supply of the sensing current. Such variation in the voltage serves to identify the magnetic binary data. The higher the recording density is to be achieved in a magnetic recording medium such as a hard disk, a larger current value is required to the sensing current. Without the sensing current of a larger current value, it is supposedly impossible to read the magnetic information data out of the magnetic recording medium without an error.

On the other hand, a sensing current of an increased current value is supposed to induce deterioration in the electromagnetic transducer and/or to shorten the lifetime of the electromagnetic transducer. It is thus required to set the current value of the sensing current at the highest level which still ensures a longer lifetime of the electromagnetic transducer. Heretofore, no specific method of determining the magnitude of the sensing current has been proposed to meet this demand.

SUMMARY OF THE INVENTION

It is accordingly an object of the present invention to provide a method of determining the magnitude or current value of a sensing current, which is capable of setting the sensing current of a larger magnitude while satisfying the demand for a longer lifetime of an electromagnetic transducer.

According to the present invention, there is provided: a method of determining a magnitude of a sensing current to be supplied to an electromagnetic transducer, comprising: supplying an electric current of a first current value to the electromagnetic transducer; determining a physical quantity appearing in the electromagnetic transducer based on the electric current of the first current value; supplying an electric current of a second current value, different from the first current value, to the electromagnetic transducer; determining the physical quantity appearing in the electromagnetic transducer based on the electric current of the second current value; and determining the magnitude of the sensing current based on change found in the physical quantity.

If any correlation can be found between the physical quantity and the variation in temperature in the electromagnetic transducer, the variation in temperature can be determined based on the change or variation in the physical quantity. The variation in temperature can thus be determined for the specific electromagnetic transducer. If the current value for the sensing current can be determined based on the determined variation in temperature for the specific electromagnetic transducer, it is possible to set the optimal current value unique to the specific electromagnetic transducer.

As conventionally known, the lifetime of the electromagnetic transducer such as a magnetoresistive (MR) element greatly depends upon the temperature. If the variation in the temperature of the electromagnetic transducer is actually measured in determining the current value of the sensing current in the above-described manner, it is possible to reliably set the maximum current value for the specific electromagnetic transducer without suffering from deterioration or a shortened lifetime resulting from pa fracturing or destructive phenomenon such as a so-called migration. Setting of the thus determined maximum current value for the sensing current enables an accurate detection of the magnetic binary data while satisfying the demand to a longer lifetime of the individual electromagnetic transducer.

Specifically, the method of determination may further comprise: calculating a first electric resistance value of the electromagnetic transducer based on a first voltage value appearing in the electromagnetic transducer in response to supply of the electric current of the first current value; calculating a second electric resistance value of the electromagnetic transducer based on a second voltage value appearing in the electromagnetic transducer in response to supply of the electric current of the second current value; and calculating a quantity of variation in temperature of the electromagnetic transducer based on the first and second electric resistance values in determining the magnitude of the sensing current, for example.

In determining the maximum current value for the sensing current, the method of determination preferably changes the second current value so as to calculate the variation in temperature. As conventionally known, a specific correlation can be found between the lifetime of the electromagnetic transducer such as an MR element and the variation in temperature as well as the magnitude of the electric current. If the variation in temperature and the current value are revealed, it is possible to presume an expected lifetime of the electromagnetic transducer. When the thus presumed lifetime is compared with a predetermined reference or target lifetime of the electromagnetic transducer, the maximum current value for the sensing current, satisfying the demand to a longer lifetime of the electromagnetic transducer, can be obtained in a facilitated manner.

The aforementioned method of determination may be applied to a magnetic recording medium drive incorporating not only an electromagnetic transducer for reading data but also an electromagnetic transducer for writing data paired with the electromagnetic transducer for reading data. In this case, when the second electric resistance value is to be detected at the electromagnetic transducer for reading data, it is preferable that an electric current is also supplied to the electromagnetic transducer for writing data. In general, the variation in temperature of the electromagnetic transducer for writing data influences the temperature of the electromagnetic transducer for reading data in a service environment. If the electric current is supplied to the electromagnetic transducer for writing data in this manner, the second electric resistance value of the electromagnetic transducer for reading data can be detected in a condition similar to the service environment. Accordingly, the aforementioned maximum current value can be derived at a still higher accuracy.

The aforementioned method of determination can be realized with the performance of a so-called computer, a central processing unit (CPU), a microprocessor unit (MPU), and the like. In this case, a software program designed to realize the method of determination may be stored in a portable storage medium such as a diskette (FD), a compact disk (CD), a memory card, and the like, for example. Alternatively, the software program may be stored in a memory chip such as a flash memory, and the like. Such a memory chip may be mounted on a printed circuit board to be incorporated or assembled in a recording medium drive such as a hard disk drive (HDD), a magnetic tape drive, and the like.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
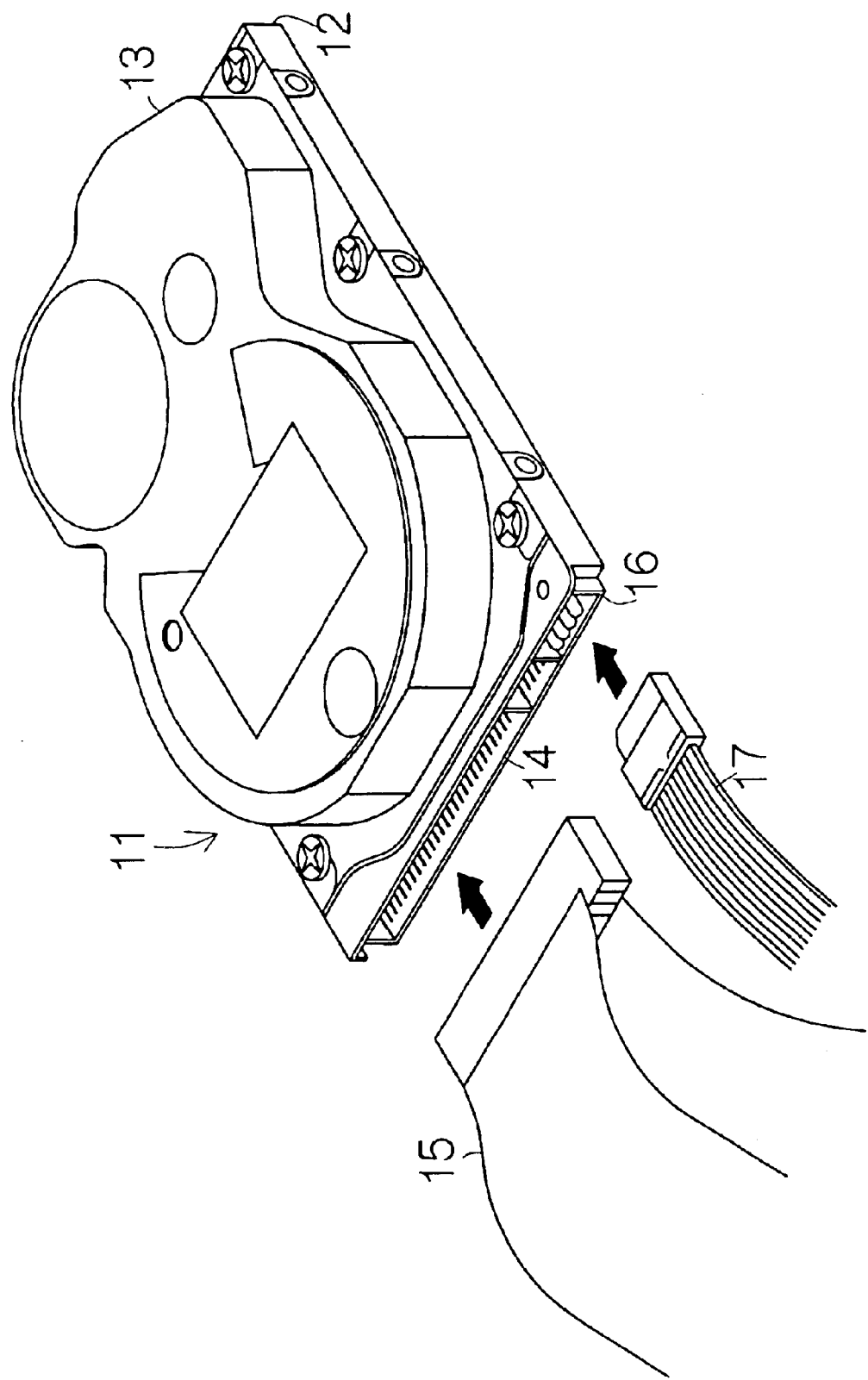
FIG. 1 is a perspective view schematically illustrating a hard disk drive (HDD)

FIG. 1 illustrates a hard disk drive (HDD) as an example of a magnetic recording medium drive 11. The HDD 11 includes a plate-shaped base 12 and a primary enclosure 13 received on the flat upper surface of the base 12 so as to define a closed space between the base 12 and itself. The primary enclosure 13 may be formed by deep-drawing, for example. The HDD 11 may be incorporated in a computer, not shown, such as a workstation, a personal computer, and the like. Otherwise, the HDD 11 may be constructed as a separate storage device independent of such a computer.

A printed circuit board, not shown, is attached to the back or lower surface of the base 12. A HDD (hard disk drive) controller circuit is established on the front surface of the base 12 so as to control the performance of the HDD 11, as described later in detail. A connector 14 is mounted on the lower surface of the printed circuit board so as to establish an interface, such as IDE and SCSI, for control and data signals. The connector 14 is electrically connected to HDD controller circuit. When the connector 14 receives a signal cable 15 extending from a main board of a computer, a control and data transmission path is established between the HDD controller circuit and the main board of the computer. The HDD controller circuit is designed to operate in response to supply of the electric power supplied through a connector 16 which is designed to receive an electric power cable 17 extending from a power supply unit of the computer, for example.

Figure 2:
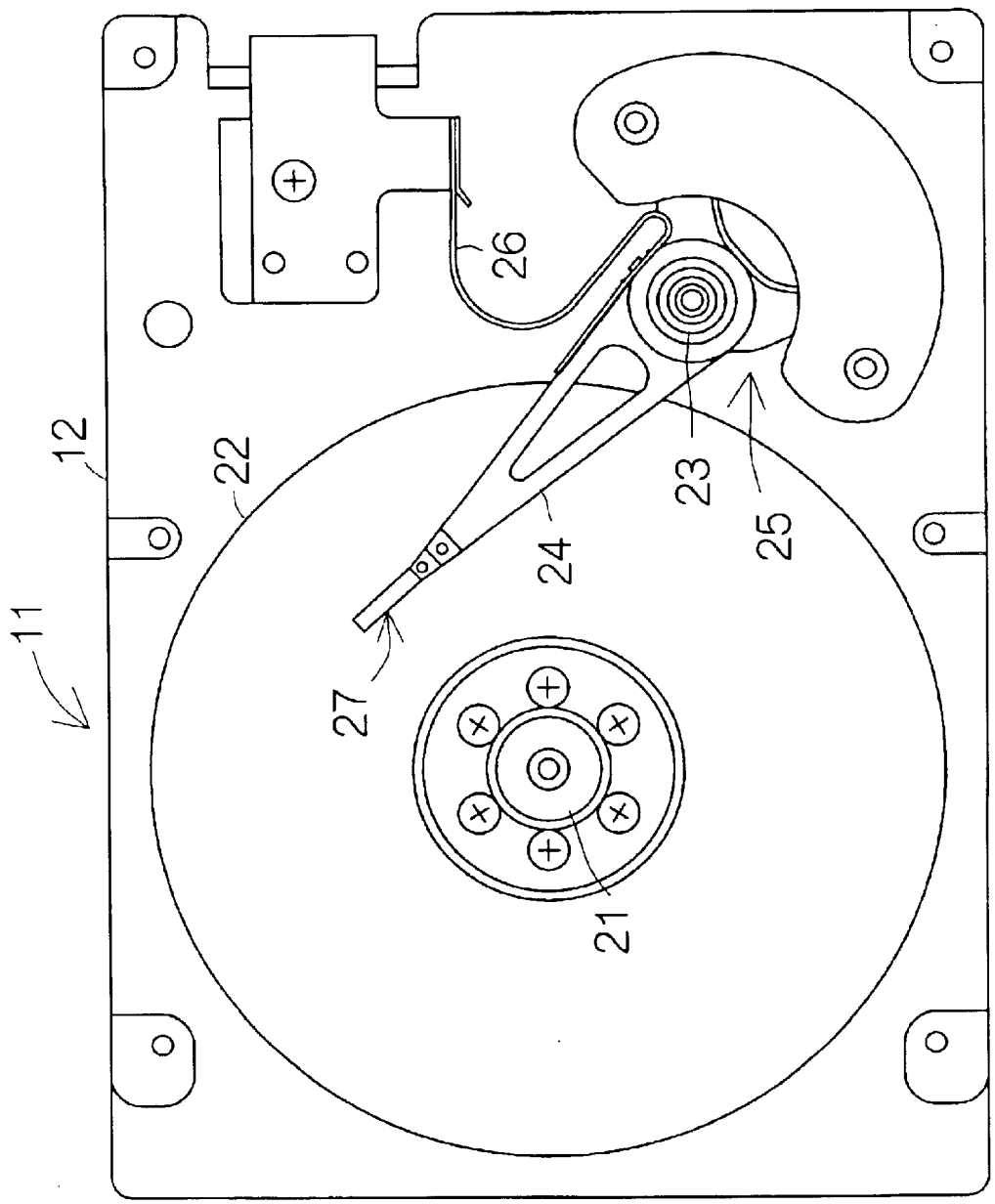
FIG. 2 is a plan view schematically illustrating the interior structure of the HDD.

As shown in FIG. 2, the upper surface of the base 12 is designed to receive at least one magnetic recording medium or disk 22 mounted on a spindle motor 21, and a rigid carriage arm 24 capable of swinging around a support shaft 23. The spindle motor 21 is designed to drive the magnetic recording disk 22 for rotation around its rotational axis. An electromagnetic actuator 25 such as a voice coil motor (VCM) serves to realize the swinging movement of the carriage arm 24. When the primary enclosure 13 is coupled to the upper surface of the base 12, the magnetic recording disk 22 and the carriage arm 24 are enclosed within the closed space defined between the base 12 and the primary enclosure 13.

As is apparent from FIG. 2, a flexible printed circuit board (FPC) 26 extending from the back of the aforementioned printed circuit board is connected to the carriage arm 24. A read/write controller circuit, namely, a head IC (integrated circuit), not shown, is mounted on the surface of the FPC 26 so as to manage the reading and writing of a magnetic information data from and to the magnetic recording disk 22. The read/write controller circuit will be described later in detail.

Figure 3:
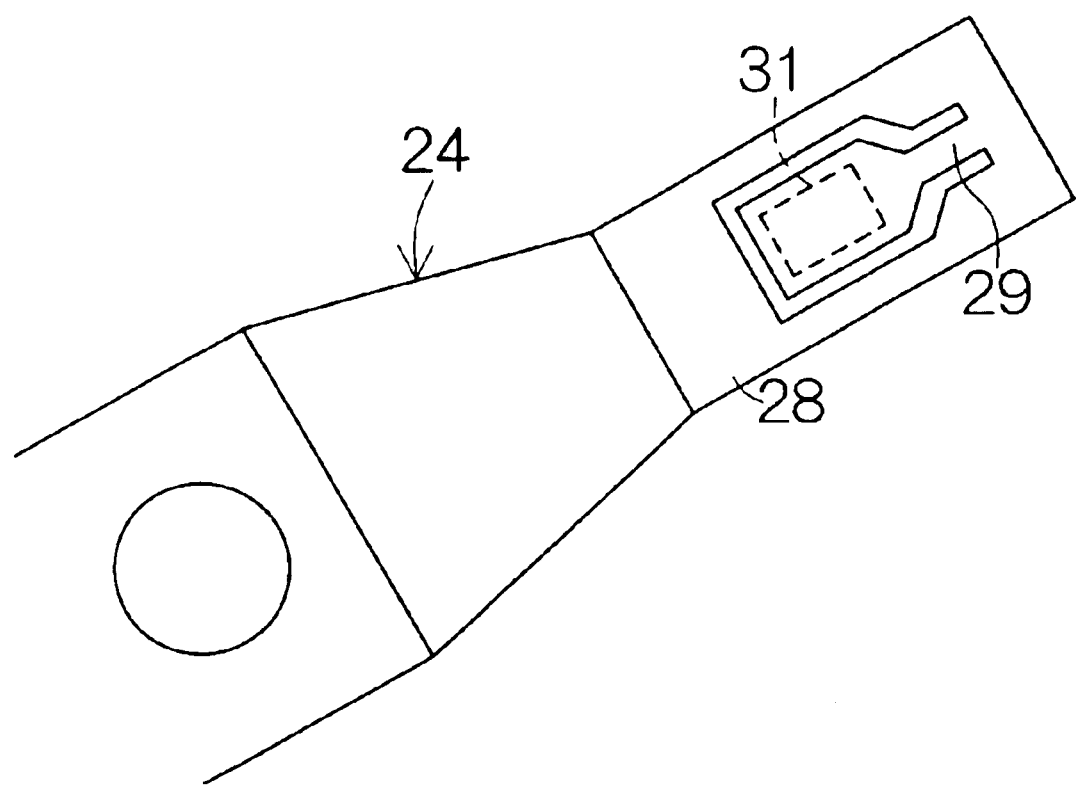
FIG. 3 is an enlarged partial plan view schematically illustrating the structure of a magnetic head assembly.

A magnetic head assembly 27 is supported at the tip end of the carriage arm 24. The magnetic head assembly 27 includes an elastic suspension 28 fixed at the tip end of the rigid carriage arm 24, and a gimbal spring 29 cantilevered on the elastic suspension 28, as shown in FIG. 3, for example. A head slider 31 is attached to the gimbal spring 29 so as to oppose its bottom surface to the surface of the magnetic recording disk 22. The elastic suspension 28 is designed to establish an urging force acting on the head slider 31 in the direction toward the surface of the magnetic recording disk 22. The head slider 31 is designed to fly above the surface of the magnetic recording disk 22 against the urging force from the elastic suspension 28 when the head slider 31 receives an airflow generated along the surface of the rotating magnetic recording disk 22.

As conventionally known, the head slider 31 is designed to carry a thin film magnetic head element for writing magnetic binary data into the magnetic recording disk 22 and a magnetoresistive (MR) element for reading magnetic binary data out of the magnetic recording disk 22. The thin film magnetic head element and the MR element are allowed to write and read magnetic binary data into and out of the magnetic recording disk 22, respectively, during flight of the head slider 31, for example. Thin film metallic or conductive patterns are formed on the carriage 24, the elastic suspension 28 and the gimbal spring 29 so as to establish a data or signal transmission path between the aforementioned HDD controller circuit and the thin film magnetic head element as well as the MR element. As is apparent from FIG. 2, when the carriage arm 24 swings, the head slider 31 is allowed to move in the radial direction of the magnetic recording disk 22 so as to cross the recording tracks on the magnetic recording disk 22. This radial movement of the head slider 31 serves to position the thin film magnetic head element and the MR element right above a target recording track on the magnetic recording disk 22 when a magnetic information data is to be recorded in or read out of the magnetic recording disk 22. A thin film coil pattern may be employed to generate the magnetic field or flux in the thin film magnetic head element, as conventionally known. The MR element may include a giant magnetoresistive (GMR) element, a tunnel-junction magnetoresistive (TMR) element, and the like, for example.

Figure 4:
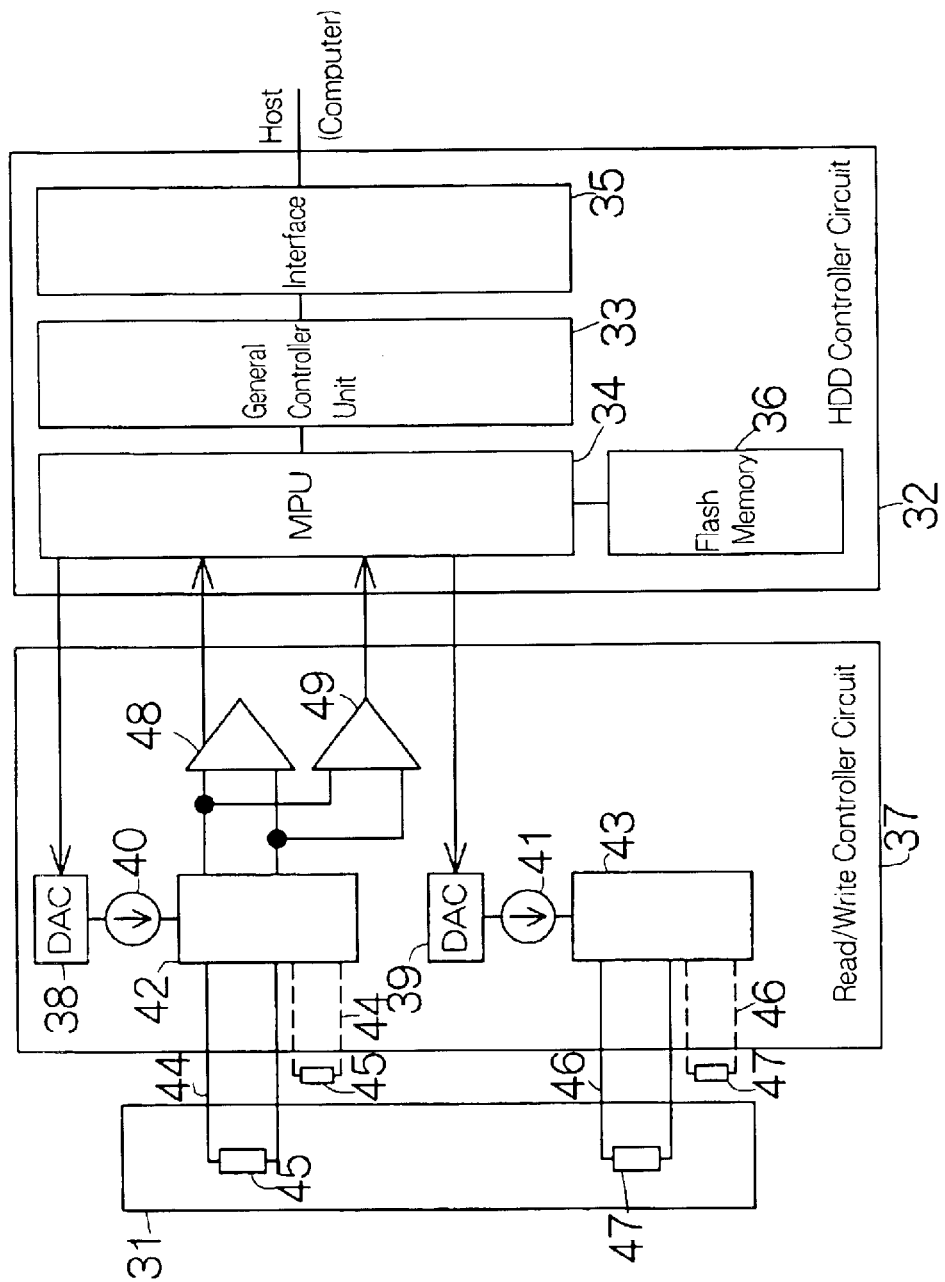
FIG. 4 is a block diagram schematically illustrating the structure of an HDD (hard disk drive) controller circuit and a read/write controller circuit.

Next, a detailed description will be made on the structure of the HDD controller circuit and the read/write controller circuit. As shown in FIG. 4, the HDD controller circuit 32 includes a general controller unit 33 designed to manage the overall operation of the HDD 11, and a microprocessor unit (MPU) 34 designed to in particular manage the reading and writing of a magnetic information data with respect to the: magnetic recording disk 22 with the assistance of the general controller unit 33, for example. The general controller unit 33 is connected to the connector 14 through an interface circuit 35. A flash memory 36 is connected to the MPU 34. When controlling the read/write operation, the MPU 34 fetches a firmware and data stored in the flash memory 36 so as to achieve an appropriate processing.

The read/write controller circuit 37 includes first and second digital/analog (D/A) converters 38, 39 designed to convert digital signals from the MPU 34 to corresponding analog signals, and first and second electric current sources 40, 41 designed to output an electric current of a specific current value designated by the analog signal supplied from the first and second D/A converters 38, 39, for example. The electric current output from the first electric current source 40 is supplied to a biasing circuit 42 connected to the first electric current source 40. Likewise, the electric current output from the second electric current source 41 is supplied to a current supplying circuit 43 connected to the second electric current source 41.

Sensing channels 44 are connected to the biasing circuit 42. The MR elements 45 incorporated in the aforementioned magnetic head assembly 27 are respectively connected to the corresponding sensing channels 44. The biasing circuit 42 is allowed to selectively direct the electric current from the first electric current source 40 to any one of the sensing channels 44.

In the same manner, current supplying channels 46 are connected to the current supplying circuit 43. The thin film magnetic head elements 47 incorporated in the aforementioned magnetic head assembly 27 are respectively connected to the corresponding current supplying channels 46. The current supplying circuit 43 is allowed to selectively direct the electric current from the second electric current source 41 to any one of the current supplying channels 46.

The biasing circuit 42 is designed to receive the connection of a data signal amplifier 48 and an examination signal amplifier 49. The data signal amplifier 48 is designed to amplify variation in the voltage appearing in the sensing channel 44 in response to supply of the electric current from the biasing circuit 42. The amplified variation in the voltage is supplied to the MPU 34 of the HDD controller circuit 32. This amplified variation represents magnetic information data. Likewise, the examination signal amplifier 49 is designed to amplify a potential difference appearing in the sensing channel 44 in response to supply of the electric current from the biasing circuit 42. The amplified potential difference is supplied to the MPU 34 as a voltage value signal.

Next, a brief description will be made on the operation of the HDD 11. When the general controller unit 33 receives instructions for reading out magnetic magnetic information data, the general controller unit 33 instructs to start the rotation of the magnetic recording disk 22. The MPU 34 serves to designate an appropriate one of the MR elements 45 to be employed to read out the magnetic information data. The biasing circuit 42 then selects the specific sensing channel 44 connected to the designated MR element 45. An electric current path is established between the designated MR element 45 and the first electric current source 40.

The MPU 34 is then allowed to obtain current value information data representing the current value for the sensing current. The current value information data is previously stored in the flash memory 36. The current value information data contains the current values unique to the respective MR elements 45. The current values are determined or set based on variation in the temperature of the individual MR element 45, as described later in detail. The MPU 34 then supplies an instructions signal specifying the obtained current value information data to the first D/A converter 38. The first D/A converter 38 outputs an analog signal designed to represent the current value included in the instructions signal. The first electric current source 40 outputs the electric current of the current value designated by the analog signal.

The electric current from the first electric current source 40, namely, a sensing current is supplied to the designated MR element 45 through the selected sensing channel 44. The electric resistance varies at the designated MR element 45, which receives the sensing current, in response to the direction of the magnetic flux or field established based on the magnetic binary data stored in the magnetic recording disk 22. Variation in the voltage thus appears in the sensing channel 44 in response to inversion of the magnetic flux or field. The variation in the voltage is then supplied to the MPU 34 after being amplified at the data signal amplifier 48. The magnetic information data is read out of the magnetic recording disk 22 in this manner.

On the other hand, the MPU 34 serves to designate an appropriate one of the thin film magnetic head element 47 to be employed to write magnetic information data in the magnetic recording disk 22, when the general controller unit 33 receives instructions for recording the magnetic information data. The current supplying circuit 43 then selects the specific current supplying channel 46 connected to the designated thin film magnetic head element 47. The MPU 34 thereafter serves to supply an instructions signal specifying a predetermined current value to the second D/A converter 39 in the aforementioned manner. The second D/A converter 39 outputs an analog signal designed to represent the current value included in the instructions signal. The second electric current source 41 outputs the electric or writing current of the current value designated by the analog signal. The thin film magnetic head element 47 is thus allowed to write the magnetic binary data into the magnetic recording disk 22 in response to supply of the electric or writing current.

Figure 5:
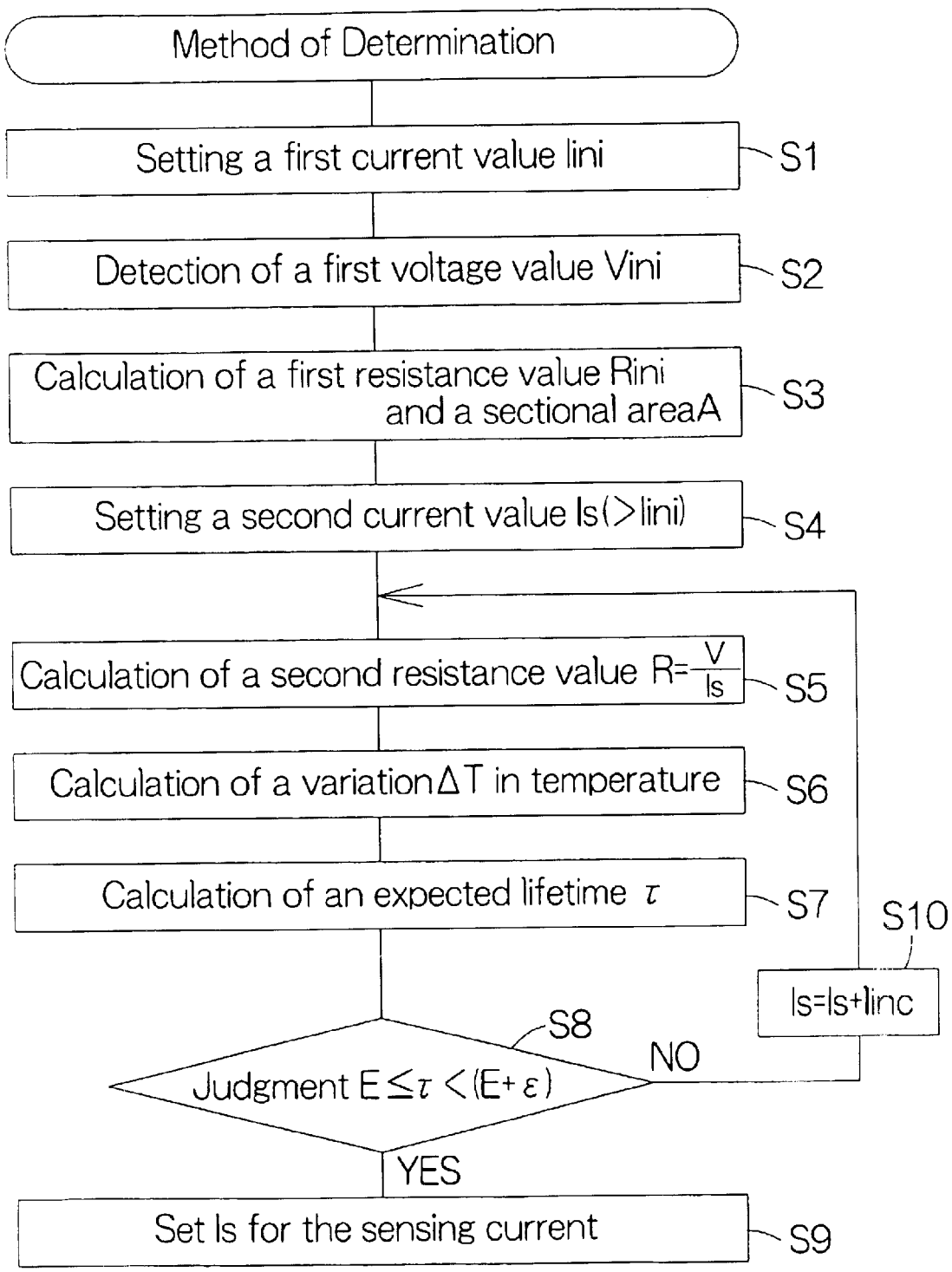
FIG. 5 is a flowchart schematically illustrating a method of determining the magnitude of a sensing current.

Next, a detailed description will be made of a method of determining the magnitude or current value of the sensing current, referring to the flowchart shown in FIG. 5. Here, the method can be realized based on the operation or processing of the MPU 34. The MPU 34 operates in accordance with the computer program or firmware stored in the flash memory 36, for example. The method of determination may be conducted at a factory of the HDD 11 after the HDD 11 has been assembled. Additionally, the method may be conducted every time when the HDD 11 is turned on. A specific instructions signal may be input to the interface circuit 35 from the outside of the HDD 11 so as to allow the MPU 34 to achieve the processing in the same manner as the aforementioned firmware stored in the flash memory 36.

At step S1, the MPU 34 obtains a data representing a predetermined initial current value or first current value $I_{ini}$ for the electric current supplied to the designated MR element 45. The data representing the first current value $I_{ini}$ may previously be stored in the flash memory 36. The first current value $I_{ini}$ may be set at the smallest value generated at the read/write controller circuit 37, for example, at 1 mA. When the instructions signal representing the first current value $I_{ini}$ is supplied to the first D/A converter 38, the first D/A converter 38 outputs an analog signal representing the first current value $I_{ini}$. The first electric current source 40 then outputs an examination current of the first current value $I_{ini}$ to the biasing circuit 42. The biasing circuit 42 directs the examination current to the designated MR element 45.

A potential difference, namely, a first voltage value $V_{ini}$ appears in the sensing channel 44 in response to supply of the examination current. The first voltage value $V_{ini}$ is supplied to the MPU 34 after being amplified at the examination signal amplifier 49. The MPU 34 detects the first voltage value $V_{ini}$ appearing in the designated MR element 45 in this manner at step S2.

Subsequently, the MPU 34 calculates an initial resistance value or a first resistance value $R_{ini}$ of the designated MR element 45 at step S3. As conventionally known, the first resistance value $R_{ini}$ can be obtained in accordance with the following equation:

$$R_{ini} = \frac{V_{ini}}{I_{ini}} \quad (1)$$

The MPU 34 then operates to calculate the area A of a cross-section of the designated MR element 45 based on the calculated first resistance value $R_{ini}$. The profile of the cross-section may be defined in a plane perpendicular to the direction of the examination current. The MPU 34 utilizes the following equation in calculating the area A of the cross-section:

$$A = \frac{\rho L}{R_{ini}} \quad (2)$$

Here, the representation $\rho$ specifies the resistivity of the designated MR element 45. The representation L specifies the length of the designated MR element 45. The resistivity $\rho$ has a specific value unique to the kind of the material used in the MR element 45. The length L of the MR element 45 can be measured in the direction of the examination current. The resistivity $\rho$ and the length L of the MR element 45 may previously be stored in the flash memory 36, for example. The calculated first resistance value $R_{ini}$ and the area A may be stored in a RAM (random access memory), not shown, incorporated in the MPU 34, for example.

The MPU 34 thereafter outputs an instructions signal representing a second current value $I_s$ different from the first current value $I_{ini}$ to the first D/A converter 38 at step S4. The second current value $I_s$ may be set at a value larger than the first current value $I_{ini}$, at 2 mA in this case, for example. A data representing the second current value $I_s$ may previously be stored in the flash memory 36. The first D/A converter 38 outputs an analog signal representing the second current value $I_s$. The first electric current source 40 this time outputs the examination current of the second current value $I_s$ to the biasing circuit 42.

Simultaneously, the MPU 34 outputs an instructions signal representing a current value for the writing current to the second D/A converter 39. The second D/A converter 39 outputs an analog signal representing the designated current value for the writing current. The second electric current source 41 outputs the writing current of the designated current value to the current supplying circuit 43. In this manner, the writing current is supplied to the thin film magnetic head element 47 paired with the designated MR element 45 from the current supplying circuit 43.

At step S5, the MPU 34 detects a potential difference or a second voltage value V based on the examination current of the second current value $I_s$ in the aforementioned manner. A second resistance value R of the designated MR element 45 is then calculated based on the derived second voltage value V and the second current value $I_s$.

Thereafter, the MPU 34 calculates the variation or rise $\Delta T$ in the temperature of the designated MR element 45 based on the first and second resistance values $R_{ini}$, R, at step S6.

The calculation of the variation $\Delta T$ is conducted in accordance with the following equation:

$$\Delta T = \frac{\Delta R}{R_{ini}}\gamma = \frac{R - R_{ini}}{R_{ini}}\gamma \quad (3)$$

Here, the representation $\gamma$ specifies the temperature coefficient. The temperature coefficient $\gamma$ has a value unique to the kind of the material used in the MR element 45. The temperature coefficient $\gamma$ may be derived from the actual measurement. The MPU 34 is allowed to obtain a data representing the measured temperature coefficient $\gamma$ from the flash memory 36, for example.

The MPU 34 thereafter calculates the lifetime $\tau$[hour] of the designated MR element 45 based on the calculated variation $\Delta T$ In the temperature, at step S7. The calculation of the lifetime $\tau$[hour] can be conducted in accordance with the following equation:

$$\tau = \frac{1}{J^2}\alpha \cdot \exp\left(\frac{1}{T}\beta\right) \quad (4)$$

Here, the representation J specifies the current density (quantity of the current per unit cross-sectional area) of the MR element 45. The representation T specifies the temperature [K] of the MR element 45. The current density J can be obtained based on the second current value $I_s$ of the examination current and the aforementioned area A of the cross section in accordance with the following equation:

$$J = \frac{I_s}{A} \quad (5)$$

The temperature T of the designated MR element 45 can be calculated based on the room temperature $T_{room}$[K] and the calculated variation $\Delta T$ in the temperature in accordance with the following equation:

$$T = T_{room} + \Delta T \quad (6)$$

The room temperature $T_{room}$ can be set at a specific value corresponding to 25 degrees Celsius, for example. Such information can be stored in the flash memory 36. The coefficients $\alpha$ and $\beta$ included in the aforementioned equation (4) may also be stored in the flash memory 36. The coefficients $\alpha$ and $\beta$ may be derived from the actual measurement.

The MPU 34 then judges the calculated lifetime $\tau$ at step S8. The MPU 34 refers to a predetermined reference lifetime E[hour]. The reference lifetime E may be set at a required level such as 100,000[hours], for example. In judgment, the MPU 34 obtains a data representing the reference lifetime E from the flash memory 36. If the calculated lifetime $\tau$ takes a value below the target upper limit lifetime (E+$\epsilon$), the MPU 34 is allowed to designate the set second current value $I_s$ as the current value of the sensing current, at step S9. Here, the representation $\epsilon$ specifies a margin exceeding the reference lifetime E. The derived current value of the sensing current may be stored in the flash memory 36.

If the calculated lifetime $\tau$ exceeds the target upper limit lifetime (E+$\epsilon$), the MPU 34 sets a new value for the second current value $I_s$ at step S10. A predetermined incremental value $I_{inc}$ may be added to the preceding second current value $I_s$ to provide a new second current value $I_s$. The MPU 34 again proceeds with the process of steps S5–S8 using the new second current value $I_s$. The process of steps S5–S8 may be repeated until the calculated lifetime $\tau$ becomes short of the target upper limit lifetime (E+ε). When the calculated lifetime τ takes a value below the target upper limit lifetime (E+ε), the MPU 34 is allowed to set the final second current value $I_s$ for the current value of the sensing current. In this case, the narrower the margin ε is set, the larger value the current value of the sensing current can take.

The above-described method of determination is conducted for every MR element 45 to be incorporated in the HDD 11. The current value $I_s$ of the sensing current can be determined based on the actual measurement for every individual MR element 45 in the above-described manner. The optimal current values $I_s$ can be set for the sensing current supplied to the individual MR element 45. Moreover, since the variation ΔT in the temperature of the MR element 45 is actually measured in determining the current value $I_s$, it is possible to set the maximum current value of the sensing current unique to the individual MR element 45 without suffering from deterioration or a shortened lifetime resulting from a fracturing or destructive phenomenon such as a so-called migration. Setting of the thus calculated maximum current value for the sensing current enables an accurate detection of the magnetic binary data as well as realization of a longer lifetime of the individual MR element 45.

In the aforementioned method, when the second voltage value V is to be detected for the designated MR element 45, the writing current is also supplied to the thin film magnetic head element 47 paired with the designated MR element 45 in the aforementioned manner. Accordingly, the calculated variation ΔT in the temperature reflects the influence of the rise in temperature resulting in the adjacent thin film magnetic head element 47. The lifetime τ of the designated MR element 45 can be determined in a condition similar to the environment of the actual performance or operation. The lifetime τ can thus be calculated at a still higher accuracy.

When setting the second current value $I_s$ at step S10, the incremental value $I_{inc}$ may be set at a constant value, such as 0.2 mA, for example. In this case, the incremental value $I_{inc}$ should be set at a smaller value. If a larger value is set for the incremental value $I_{inc}$, the calculated lifetime τ of the MR element 45 may involuntarily take a value below the target upper limit lifetime (E+ε) and the reference lifetime E at the same time. It is not preferable. Alternatively, the incremental value $I_{inc}$ may be stepwise or gradually reduced as the second current value $I_s$ gets larger. This type of the incremental value $I_{inc}$ may reliably allow the calculated lifetime τ of the MR element 45 to fall in a range between the target upper limit lifetime (E+ε) and the reference lifetime E.

What is claimed is:

1. A method of determining a magnitude of a sensing current to be supplied to an electromagnetic transducer, comprising:

supplying an electric current of a first current value to the electromagnetic transducer;

determining a physical quantity appearing in the electromagnetic transducer based on the electric current of the first current value;

supplying an electric current of a second current value, different from the first current value, to the electromagnetic transducer;

determining the physical quantity appearing in the electromagnetic transducer based on the electric current of the second current value;

deriving a variation in temperature of the electromagnetic transducer based on the change in the physical quantity;

determining the magnitude of the sensing current based on a derived variation in temperature of the electromagnetic transducer;

deriving an expected lifetime of the electromagnetic transducer based on the variation in temperature when determining the magnitude of the sensing current;

comparing the expected lifetime with a predetermined target upper limit lifetime; and adding an incremental value to a preceding second current value so as to set a new second current value if the expected lifetime takes a value exceeding the predetermined target upper limit lifetime.

2. The method of determining according to claim 1, wherein said predetermined upper limit lifetime represents a sum of a minimum lifetime required to the electromagnetic transducer and a margin to be added to the minimum lifetime.

3. The method of determining according to claim 2, wherein said incremental value is stepwise reduced as the preceding second current value gets larger.

4. A method of determining a magnitude of a sensing current to be supplied to an electromagnetic transducer, comprising:

supplying an electric current of a first current value to the electromagnetic transducer;

calculating a first electric resistance value of the electromagnetic transducer based on a first voltage value appearing in the electromagnetic transducer in response to supply of the electric current of the first current value;

supplying an electric current of a second current value, different from the first current value, to the electromagnetic transducer;

calculating a second electric resistance value of the electromagnetic transducer based on a second voltage value appearing in the electromagnetic transducer in response to supply of the electric current of the second current value;

calculating a quantity of variation in temperature of the electromagnetic transducer based on the first and second electric resistance values;

determining the magnitude of the sensing current based on a calculated quantity of variation in temperature of the electromagnetic transducer;

deriving an expected lifetime of the electromagnetic transducer based on the quantity of variation in temperature of the electromagnetic transducer when determining the magnitude of the sensing current;

comparing the expected lifetime with a predetermined target upper limit lifetime; and adding an incremental value to a preceding second current value so as to set a new second current value if the expected lifetime takes a value exceeding the predetermined target upper limit lifetime.

5. The method of determining according to claim 4, wherein said predetermined upper limit lifetime represents a sum of a minimum lifetime required to the electromagnetic transducer and a margin to be added to the minimum lifetime.

6. The method of determining according to claim 5, wherein said incremental value is stepwise reduced as the preceding second current value gets larger.

7. A method of determining a magnitude of a sensing current to be supplied to an electromagnetic transducer for reading data, comprising:

supplying an electric current of a first current value to the electromagnetic transducer for reading data;

determining a physical quantity appearing in the electromagnetic transducer for reading data based on the electric current of the first current value;

supplying an electric current of a second current value, different from the first current value, to the electromagnetic transducer for reading data;

supplying an electric current of a predetermined current value to an electromagnetic transducer for writing data, which is paired with the electromagnetic transducer for reading data;

determining the physical quantity appearing in the electromagnetic transducer for reading data based on the electric current of the second current value; and determining the magnitude of the sensing current based on change found in the physical quantity.

8. The method of determining according to claim 7, further comprising:

calculating a first electric resistance value of the electromagnetic transducer based on a first voltage value appearing in the electromagnetic transducer in response to supply of the electric current of the first current value;

calculating a second electric resistance value of the electromagnetic transducer based on a second voltage value appearing in the electromagnetic transducer in response to supply of the electric current of the second current value; and calculating a quantity of variation in temperature of the electromagnetic transducer based on the first and second electric resistance values in determining the magnitude of the sensing current.

9. A method of determining a magnitude of a sensing current to be supplied to an electromagnetic transducer, comprising:

supplying an electric current of a first current value to the electromagnetic transducer;

determining a physical quantity appearing in the electromagnetic transducer based on the electric current of the first current value;

supplying an electric current of a second current value, different from the first current value, to the electromagnetic transducer;

determining the physical quantity appearing in the electromagnetic transducer based on the electric current of the second current value;

determining a numerical value of a variation in temperature of the electromagnetic transducer based on the change in the physical quantity; and determining the magnitude of the sensing current based on a determined numerical value of the variation in temperature of the electromagnetic transducer.

10. The method of determining according to claim 9, further comprising determining a numerical value of an expected lifetime of the electromagnetic transducer based on the numerical value of the variation in temperature when determining the magnitude of the sensing current.

11. The method of determining according to claim 9, wherein the numerical value of the variation in temperature is determined by utilizing a temperature coefficient, and the temperature coefficient has a value depending on a material included in the electromagnetic transducer.

12. A method of determining a magnitude of a sensing current to be supplied to an electromagnetic transducer, comprising:

supplying an electric current of a first current value to the electromagnetic transducer;

calculating a first electric resistance value of the electromagnetic transducer based on a first voltage value appearing in the electromagnetic transducer in response to supply of the electric current of the first current value;

supplying an electric current of a second current value, different from the first current value, to the electromagnetic transducer;

calculating a second electric resistance value of the electromagnetic transducer based on a second voltage value appearing in the electromagnetic transducer in response to supply of the electric current of the second current value;

determining a numerical value of a variation in temperature of the electromagnetic transducer based on the first and second electric resistance values; and determining the magnitude of the sensing current based on a determined numerical value of the variation in temperature of the electromagnetic transducer.

13. The method of determining according to claim 12, further comprising determining a numerical value of an expected lifetime of the electromagnetic transducer based on numerical value of the variation in temperature of the electromagnetic transducer when determining the magnitude of the sensing current.

14. The method of determining according to claim 12, wherein the numerical value of the variation in temperature is calculated in accordance with the following equation:

$$\Delta T = \frac{R - R_{ini}}{R_{ini}} \gamma$$

where $\Delta T$ indicates the numerical value of the variation in temperature, $R_{ini}$ indicates the first electric resistance value, R indicates the second electric resistance value and $\gamma$ indicates a temperature coefficient.

15. The method of determining according to claim 12, wherein the numerical value of the variation in temperature is calculated by utilizing a temperature coefficient, and the temperature coefficient has a value depending on a material included in the electromagnetic transducer.

16. A computer-readable storage medium containing program instructions for determining a magnitude of a sensing current to be supplied to an electromagnetic transducer, comprising:

computer program code causing a computer to supply an electric current of a first current value to the electromagnetic transducer;

computer program code causing a computer to determine a physical quantity appearing in the electromagnetic transducer based on the electric current of the first current value;

computer program code causing a computer to supply an electric current of a second current value, different from the first current value, to the electromagnetic transducer;

computer program code causing a computer to determine the physical quantity appearing in the electromagnetic transducer based on the electric current of the second current value;

computer program code causing a computer to determine a numerical value of a variation in temperature of the electromagnetic transducer based on the change in the physical quantity; and computer program code causing a computer to determine the magnitude of the sensing current based on a determined numerical value of the variation in temperature of the electromagnetic transducer.

17. The computer-readable storage medium according to claim 16, wherein said storage medium is a memory chip incorporated in a magnetic disk drive.

18. A computer-readable storage medium containing program instructions for determining a magnitude of sensing current to be supplied to an electromagnetic transducer, comprising:

computer program code causing a computer to supply an electric current of a first current value to the electromagnetic transducer;

computer program code causing a computer to calculate a first electric resistance value of the electromagnetic transducer based on a first voltage value appearing in the electromagnetic transducer in response to supply of the electric current of the first current value;

computer program code causing a computer to supply an electric current of a second current value, different from the first current value, to the electromagnetic transducer;

computer program code causing a computer to calculate a second electric resistance value of the electromagnetic transducer based on a second voltage value appearing in the electromagnetic transducer in response to supply of the electric current of the second current value; and computer program code causing a computer to determine a numerical value of a variation in temperature of the electromagnetic transducer based on the first and second electric resistance values; and computer program code causing a computer to determine the magnitude of the sensing current based on a determined numerical value of the variation in temperature of the electromagnetic transducer.

19. The computer-readable storage medium according to claim 18, wherein said storage medium is a memory chip incorporated in a magnetic disk drive.

* * * * *